United States Patent Office 2,885,418
Patented May 5, 1959

2,885,418

MERCURATED ALKANESULFONAMIDES

John J. Traverso and Calvert W. Whitehead, Indianapolis, Ind., assignors to Eli Lilly and Company, Indianapolis, Ind., a corporation of Indiana No Drawing. Application September 11, 1957
Serial No. 683,209

3 Claims. (Cl. 260—431)

This invention relates to novel mercurated alkanesufonamides.

The novel compounds provided by this invention can be represented by the formula

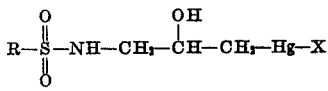

wherein R is a lower alkyl group having from one to four carbon atoms, and X is a pharmaceutically acceptable anion of a mineral acid, such being an anion of relatively nontoxic character, for example, chloride, bromide, phosphate, nitrate, and the like.

The novel compound represented by the above formula are white, crystalline solids. They are readily prepared by reacting a mixed anion mercuric salt with an N-allyl alkanesulfonamide, the addition reaction being carried out in aqueous solution.

The N-allyl alkanesulfonamides used as starting materials in the above reaction are prepared by customary methods, for example, by the reaction of an alkanesulfonylchloride with allylamine in the presence of pyridine. The mixed anion mercuric salt employed in the reaction can be prepared in aqueous solution, and the solution containing the mixed salt can be used directly. In such case, the mercuration reaction is carried out simply by adding the N-allyl alkanesulfonamide to the aqueous solution of mixed mercuric anion salt, warming the mixture to about 60° C. for about one hour, and cooling the solution to crystallize the organic mercury compound. The mercury compound can be purified by recrystallizing it from aqueous solution.

The following equation in which X and R have the same meaning as hereinabove, illustrates the course of the preparative reaction.

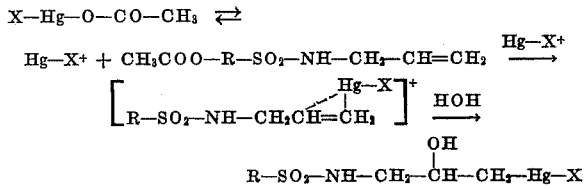

It should be noted that, as shown by the above equation, the final mercurated product contains a hydroxy group supplied by the water present in the reaction mixture.

The compounds provided by this invention are useful as diuretic agents. They can be administered either intravenously or orally in injectable solution form or in solid tablet or capsule form.

This invention is further illustrated by the following specific examples.

EXAMPLE 1

*Preparation of N-allyl alkanesulfonamides*

One mol of allylamine and one mol of pyridine were dissolved in one liter of ether, and to the solution was added, dropwise, one mol of methanesulfonylchloride. After the addition had been completed, the reaction mixture was stirred for about one hour after which time about 500 ml. of water were added. The ether layer containing the N-allyl methanesulfonamide was separated from the aqueous layer, and was dried. The ether was removed by evaporation in vacuo, and the N-allyl methanesulfonamide was purified by distillation. N-allyl methanesulfonamide boiled at a temperature of about 103° C. at a pressure of about 0.7 mm. of mercury.

*Analysis.*—Calculated: N, 10.35. Found: N, 10.47.

N-allyl ethanesulfonamide was prepared in the same way except that ethanesulfonylchloride was used in place of methanesulfonylchloride. N-allyl ethanesulfonamide boiled at about 117–120° C. at a pressure of about 0.5 mm. of mercury.

*Analysis.*—Calculated: N, 9.41. Found: N, 9.47.

N-allyl n-butanesulfonamide was prepared as above except that n-butanesulfonylchloride was used in place of methanesulfonylchloride. N-allyl n-butanesulfonamide boiled at about 114° C. at a pressure of about 1.5 mm. of mercury.

*Analysis.*—Calculated: N, 7.90. Found: N, 7.72.

EXAMPLE 2

*Preparation of N-(3-chloromercuri-2-hydroxypropyl) ethanesulfonamide*

A reaction mixture was prepared containing 0.05 mol of mercuric acetate and 0.05 mol of mercuric chloride in about 200 ml. of distilled water. To the resulting solution containing 0.1 mol of mercuric acetate chloride was added about 0.1 mol of N-allyl ethanesulfonamide and the resulting mixture was warmed at about 60° C. for one hour. The reaction mixture was then allowed to remain at ambient room temperature for about four days. N-(3-chloromercuri-2-hydroxypropyl) ethanesulfonamide crystallized from solution during this time and was isolated by filtration. Recrystallization of the filter cake yielded purified N-(3-chloromercuri-2-hydroxypropyl) ethanesulfonamide melting at about 84° C.

*Analysis.*—Calculated: Hg, 49.87. Found: Hg, 49.90.

N-(3-bromomercuri-2-hydroxypropyl) ethanesulfonamide was prepared in an analogous fashion except that a mercuric bromide acetate was employed as the mixed anion mercuric salt in place of mercuric chloride acetate. N-(3-bromomercuri-2-hydroxypropyl) ethanesulfonamide melted at about 118° C.

*Analysis.*—Calculated: N, 3.14. Found: N, 3.07.

The corresponding nitrate or thiocyanate salts can be prepared in the same way using the appropriate mixed anion mercuric salt.

EXAMPLE 3

*Preparation of N-(3-chloromercuri-2-hydroxypropyl) methanesulfonamide*

N-(3-chloromercuri-2-hydroxypropyl) methanesulfonamide was prepared, following the procedure of Example 1, by reacting N-allyl methanesulfonamide with mercuric chloride acetate. It melted at about 106° C.

*Analysis.*—Calculated: Hg, 51.67; N, 3.61. Found: Hg, 51.55; N, 3.56.

N-(3-chloromercuri-2-hydroxypropyl) n-propanesulfonamide and N-(3-chloromercuri-2-hydroxypropyl) n-butanesulfonamide can be prepared similarly by reacting mercuric chloride acetate with N-allyl n-propanesulfonamide and N-allyl n-butanesulfonamide, respectively.

We claim:
1. A compound represented by the formula

$$R-\underset{\underset{O}{\|}}{\overset{\overset{O}{\|}}{S}}-NH-CH_2-\underset{\underset{}{}}{\overset{OH}{C}}H-CH_2-Hg-X$$

wherein R is a lower alkyl group having from one to four carbon atoms and X is the anion of a pharmaceutically acceptable mineral acid.

2. N-(3-chloromercuri-2-hydroxypropyl) ethanesulfonamide.

3. N-(3-chloromercuri-2-hydroxypropyl) methanesulfonamide.

References Cited in the file of this patent

UNITED STATES PATENTS

| | | |
|---|---|---|
| 2,704,767 | Ehrhart et al. | Mar. 22, 1955 |
| 2,705,716 | Werner et al. | Apr. 5, 1955 |